（12）United States Patent
Algie et al.

(10) Patent No.: US 9,032,450 B2
(45) Date of Patent: May 12, 2015

(54) ADAPTIVE AUDIO/VIDEO STREAMS PROXY

(75) Inventors: Glenn Algie, Redwood City, CA (US);
Alan Messer, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 464 days.

(21) Appl. No.: 13/174,380

(22) Filed: Jun. 30, 2011

(65) Prior Publication Data
US 2012/0192230 A1 Jul. 26, 2012

Related U.S. Application Data

(60) Provisional application No. 61/435,196, filed on Jan. 21, 2011.

(51) Int. Cl.
| | |
|---|---|
| *H04N 7/173* | (2011.01) |
| *H04L 12/56* | (2006.01) |
| *H04N 21/436* | (2011.01) |
| *H04N 21/2343* | (2011.01) |
| *H04N 21/482* | (2011.01) |
| *H04N 21/61* | (2011.01) |
| *H04N 7/16* | (2011.01) |

(52) U.S. Cl.
CPC . *H04N 21/43615* (2013.01); *H04N 21/234309* (2013.01); *H04N 21/482* (2013.01); *H04N 21/6125* (2013.01)

(58) Field of Classification Search
USPC ........... 725/80, 81, 82, 74, 78, 88; 370/395.6, 370/395.61
See application file for complete search history.

(56) References Cited

U.S. PATENT DOCUMENTS

| | | | |
|---|---|---|---|
| 6,788,646 B1 * | 9/2004 | Fodor et al. ................... | 370/230 |
| 7,975,060 B2 | 7/2011 | Monro | |
| 8,031,766 B2 | 10/2011 | Cote | |
| 8,218,439 B2 * | 7/2012 | Deshpande ................... | 370/235 |
| 8,516,529 B2 * | 8/2013 | Lajoie et al. .................... | 725/87 |
| 8,910,220 B2 * | 12/2014 | Manchester et al. ............ | 725/93 |
| 2006/0222110 A1 * | 10/2006 | Kuhtz ............................ | 375/334 |
| 2009/0178087 A1 * | 7/2009 | Menn et al. ..................... | 725/86 |
| 2009/0260042 A1 * | 10/2009 | Chiang ........................... | 725/80 |
| 2010/0189183 A1 | 7/2010 | Gu et al. | |
| 2010/0328468 A1 | 12/2010 | Chang et al. | |
| 2011/0126248 A1 * | 5/2011 | Fisher et al. .................... | 725/95 |
| 2011/0228852 A1 | 9/2011 | Budagavi | |
| 2011/0307929 A1 * | 12/2011 | Youssefmir et al. ........... | 725/89 |
| 2012/0192230 A1 * | 7/2012 | Algie et al. ..................... | 725/38 |
| 2013/0111038 A1 * | 5/2013 | Girard .......................... | 709/226 |

* cited by examiner

*Primary Examiner* — Pankaj Kumar
*Assistant Examiner* — Reuben M Brown
(74) *Attorney, Agent, or Firm* — Sherman IP LLP; Kenneth L. Sherman; Steven Laut

(57) ABSTRACT

A method is provided comprising: receiving a constant bit rate video stream representing a single video from a video source via a managed broadband connection; converting the constant bit rate video stream into a single non-adaptive bit rate video stream by modifying a video transport stack of the video to be compatible with a home device media player video transport stack; modifying a video control stack of the video to be compatible with a device in a home network; adding a home networking transport stack to the video stream, wherein the home networking transport stack is such that it would appear to the device in the home network as if the video stream came from a server local to the home network; and delivering the video stream to a device in the home network.

29 Claims, 9 Drawing Sheets

ADAPTIVE AUDIO/VIDEO STREAMS PROXY

CROSS REFERENCE TO RELATED APPLICATIONS

This application claims the benefit of priority under 35 U.S.C. 119(e) to U.S. Provisional Patent Application No. 61/435,196, filed Jan. 21, 2011, which is incorporated herein by reference for all purposes.

BACKGROUND OF THE INVENTION

1. Field of the Invention

The present invention relates generally to home networking. More specifically, the present invention relates to an adaptive audio/video stream proxy.

2. Description of the Related Art

Traditionally video delivery into the home has consisted of broadcasts delivered over airwaves, through cable, and through satellite transmissions. More recently, Internet Protocol Television (IPTV) has enabled delivery of video over managed broadband connections, including digital subscriber line (DSL) and cable modem systems. In the managed broadband environment, there is a need to place a set-top box or other device to handle the management tasks at or near the television.

More recently, however, it has become more common for mobile subscribers of providers to be served from unmanaged broadband connections while at home. The most common of these unmanaged broadband connections have been in smartphones communicating over EDGE, 3G, or 4G networks. Other devices, such as tablet computers, as well as other newer hardware devices, however, may also need to deal with such unmanaged broadband connections. Converged service providers with large mobile subscription base now have an opportunity to extend service offers into the homes of their mobile subscribers with smartphones and tablet computers, connected TVs and new devices dealing effectively with these unmanaged broadband connections. Since these providers may have hundreds of millions of mobile device subscriptions, but their penetration into the managed broadband connection market may be much more severely limited, on the order of a million or even less managed broadband connections. As such, it would be beneficial to these providers to be able to offer services such as video delivery to televisions in the home through the unmanaged broadband connections, as the number of customers who possibly would switch to such video delivery services are much more plentiful than those who merely subscribe to premium quality of service managed broadband connections.

Furthermore, televisions and set-top boxes are highly cost sensitive devices that require high volumes of sales in order to be profitable. It would therefore be beneficial to have a solution that allows for converged video services delivery via unmanaged broadband connections using the televisions and other devices already deployed in the home, as opposed needing to penetrate the consumer market with another TV or set top box device.

SUMMARY OF THE INVENTION

In a first embodiment of the present invention, a method is provided comprising: receiving a constant bit rate video stream representing a single video from a video source via a managed broadband connection; converting the constant bit rate video stream into a single non-adaptive bit rate video stream by modifying a video transport stack of the video to be compatible with a home device media player video transport stack; modifying a video control stack of the video to be compatible with a device in a home network; adding a home networking transport stack to the video stream, wherein the home networking transport stack is such that it would appear to the device in the home network as if the video stream came from a server local to the home network; delivering the video stream to a device in the home network; and acting as a remote user interface (RUI) proxy by providing an RUI to the device in the home network, the RUI allowing a user of the device in the home network to interact with the video source to control aspects of the video via the RUI proxy.

In a second embodiment of the present invention, a method is provided comprising: receiving multiple constant bit rate video streams representing multiple videos from a video source via a managed broadband connection; converting the constant bit rate video streams into one or more non-adaptive bit rate video streams by modifying a video transport stack of the video to be compatible with a home device media player video transport stack; modifying a video control stack of the videos to be compatible with a device in a home network; adding a home networking transport stack to the video streams, wherein the home network stack is such that it would appear tot eh devices in the home network as if the respective video streams came from a server local to the home network; delivering the video streams to one or more devices in the home network; acting as a remote user interface (RUI) proxy by providing one or more RUIs to the one or more devices in the home network, the one or more RUIs allowing users of the devices in the home network to interact with the video source to control aspects of the video via the RUI proxy In a third embodiment of the present invention, a method is provided comprising: receiving one or more adaptive bit rate video streams video streams representing a single video from a video source via an unmanaged broadband connection; converting the adaptive bit rate video streams into a non-adaptive single bit rate video stream by modifying a video stack of the video; modifying a video control stack of the video to be compatible with a device in a home network; adding a home network stack to the single bit rate video stream, wherein the home network stack is such that it would appear to the device in the home network as if the single bit rate video stream came from a server local to the home network; delivering the single bit rate video stream to a device in the home network; and acting as a remote user interface (RUI) proxy by providing an RUI to the device in the home network, the RUI allowing a user of the device in the home network to interact with the video source to control aspects of the video via the RUI proxy.

In a fourth embodiment of the present invention, a video stream proxy is provided comprising: an interface designed to receive one or more adaptive bit rate video streams from one or more video sources over an unmanaged connection, the adaptive bit rate video streams representing a single video; an adaptive video proxy including: a video stream converter designed to convert the one or more adaptive bit rate video streams into a first single video stream by modifying the video stack of the video, and to modify a video control stack of the video to be compatible with a device in a home network; a network stack modifier designed to add a home network stack to the first single video stream, wherein the home network stack is such that it would appear to the device in the home network as if the first single video stream came from a server local to the home network; and an RUI proxy designed to provide an RUI to the device in the home network, the RUI allowing a user of the device in the home network to interact with the video source to control aspects of the video via the RUI proxy.

In a fifth embodiment of the present invention, a system is provided comprising: a video hub office (VHO); a multicast router connected to the VHO via a managed broadband connection; a content distribution network (CDN) connected to the multicast router via a managed broadband connection; one or more adaptive multirate multistream converter devices at an edge of the CDN configured to prepare the streams for both unmanaged broadband connections and best effort managed broadband connections; a third party service provider connected to the CDN via an unmanaged broadband connection; a device connected to the CDN via a managed broadband connection, wherein the device is designed to expect non-adaptive bit rate video streams sent via the managed broadband connection; and an adaptive video proxy designed to convert one or more adaptive bit rate video streams from the third party service provider into one or more non-adaptive bit rate video stream suitable for transmission to the device via the managed broadband connection by modifying a video stack and a video control stack of the non-adaptive bit rate video stream.

In a sixth embodiment of the present invention, a non-transitory program storage device readable by a machine tangibly embodying a program of instructions executable by the machine is provided to perform a method comprising: receiving a constant bit rate video stream representing a single video from a video source via a managed broadband connection; converting the constant bit rate video stream into a single non-adaptive bit rate video stream by modifying a video transport stack of the video to be compatible with a home device media player video transport stack; modifying a video control stack of the video to be compatible with a device in a home network; adding a home networking transport stack to the video stream, wherein the home networking transport stack is such that it would appear to the device in the home network as if the video stream came from a server local to the home network; and delivering the video stream to a device in the home network.

In a seventh embodiment of the present invention, an apparatus is provided comprising: means for receiving one or more adaptive bit rate video streams video streams representing a single video from a video source via an unmanaged broadband connection; means for converting the adaptive bit rate video streams into a single bit rate video stream by modifying a video stack of the video; means for modifying a video control stack of the video to be compatible with a device in a home network; means for adding a home network stack to the single bit rate video stream, wherein the home network stack is such that it would appear to the device in the home network as if the single bit rate video stream came from a server local to the home network; means for delivering the single bit rate video stream to a device in the home network; and means for acting as a remote user interface (RUI) proxy by providing an RUI to the device in the home network, the RUI allowing a user of the device in the home network to interact with the video source to control aspects of the video via the RUI proxy.

DETAILED DESCRIPTION OF SPECIFIC EMBODIMENTS

Figure 1:
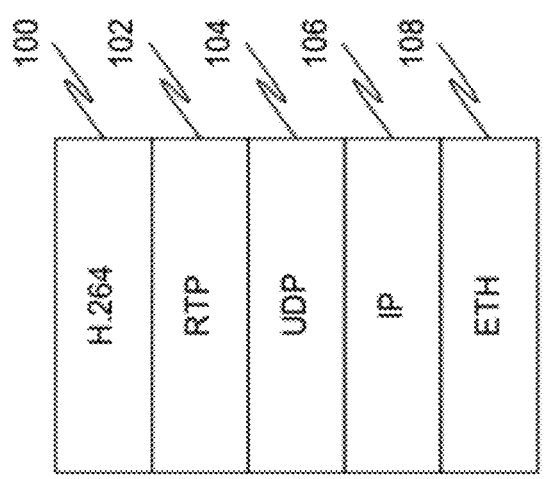
FIG. 1 is a diagram showing a protocol stack illustrating how video is commonly sent from providers in an Internet Protocol Television (IPTV) embodiment.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

The present invention reduces the need for a set-top box while extending the reach of a video subscription over unmanaged broadband paths to a home. It provides advanced adaptive methods in order to deal with the latency and loss effects over unmanaged broadband Internet infrastructure. This allows for a decoupling of the volume cost sensitive standardized streaming media players and televisions from having to deal with the ongoing, complex, and churning over the top streaming video termination requirements. Performing this function in the home facing the home WAN side as opposed to the LAN side allows it to be removed from the normal set-top box packaging paradigm.

The present invention address the over-the-top video stream decoupling opportunity, enabling the unmanaged broadband wide area network video streaming methods to thrive while remaining decoupled from the cost sensitive more standardized home network streaming methods deployed into existing streaming media player and screen endpoints, such as Digital Living Network Alliance (DLNA), Universal Plug and Play (UPnP), Digital Media Renderers (DMR)/Digital Media Servers(DMS)/Digital Media Controllers (DMC), and Consumer Electronics Association Standards (CEA2014, CEA861). In an embodiment of the present invention, an adaptive video streaming proxy is provided for the whole home such that it can be placed at a more central service hub location on the home network, facing the managed and unmanaged broadband connections in the Wide Area Network (WAN) and servicing one or more connections. This adaptive video streaming proxy performs a unique mix of video streaming transport layer adaptations, adaptive media proxies, and adaptive media control proxies. It can be mixed further to include audio/video codec transcoding methods. This unique blend of WAN to Local Area Network (LAN) and LAN to WAN as well as LAN to LAN communications allow for adaptive WAN stream effects decoding, adaptive media transport layers (e.g., Hypertext Transfer Protocol (HTTP) header adaptations, User Datagram Protocol (UDP)-Transmission Control Protocol (TCP) adaptations, audio video multiplexing transport stream Protocols (MPEG4/MPEG2TS), and stream control modifying proxies (e.g., Real-Time Streaming Protocol (RTSP), Internet Group Management Protocol (IGMP), Hypertext Transfer Protocol (HTTP)). Additionally, the adaptive stream proxy hub may contain a control service Application Program Interface (API) such that a WAN-based cloud server and/or a LAN-based service controller can send per stream setup and teardown requests and statistics. The adaptive stream proxy hub faces the home network with standard DLNA and CEA defined A/V streaming transport formats and media control protocols.

Additionally, the present invention allows for a Remote User Interface (RUI) proxy that automatically converts control packets from one protocol to another while also controlling the real time behaviors of the adaptive video proxy, in addition to being a user interface proxy for locally networked multiple audio video rendering devices.

FIG. 1 is a diagram showing a protocol stack illustrating how video is commonly sent from providers in an Internet Protocol Television (IPTV) embodiment. At the top of the stack 100, video is transmitted using the H.264 standard. H.264/MPEG-4 Part 10 or AVC (Advanced Video Coding) is a standard for video compression, and is currently one of the most commonly used formats for the recording, compression, and distribution of high definition video. At the next level down in the stack 102, RTP is utilized. Real-time Transport Protocol (RTP) defines a standardized packet format for delivering audio and video over IP networks.

At the next level down in the stack 104, User Datagram Protocol (UDP) is used. At the next level down 106, the IP protocol is used. This may indicate either a multicast or a unicast IP address. At the bottom level 108, Ethernet protocol is used.

Figure 2:
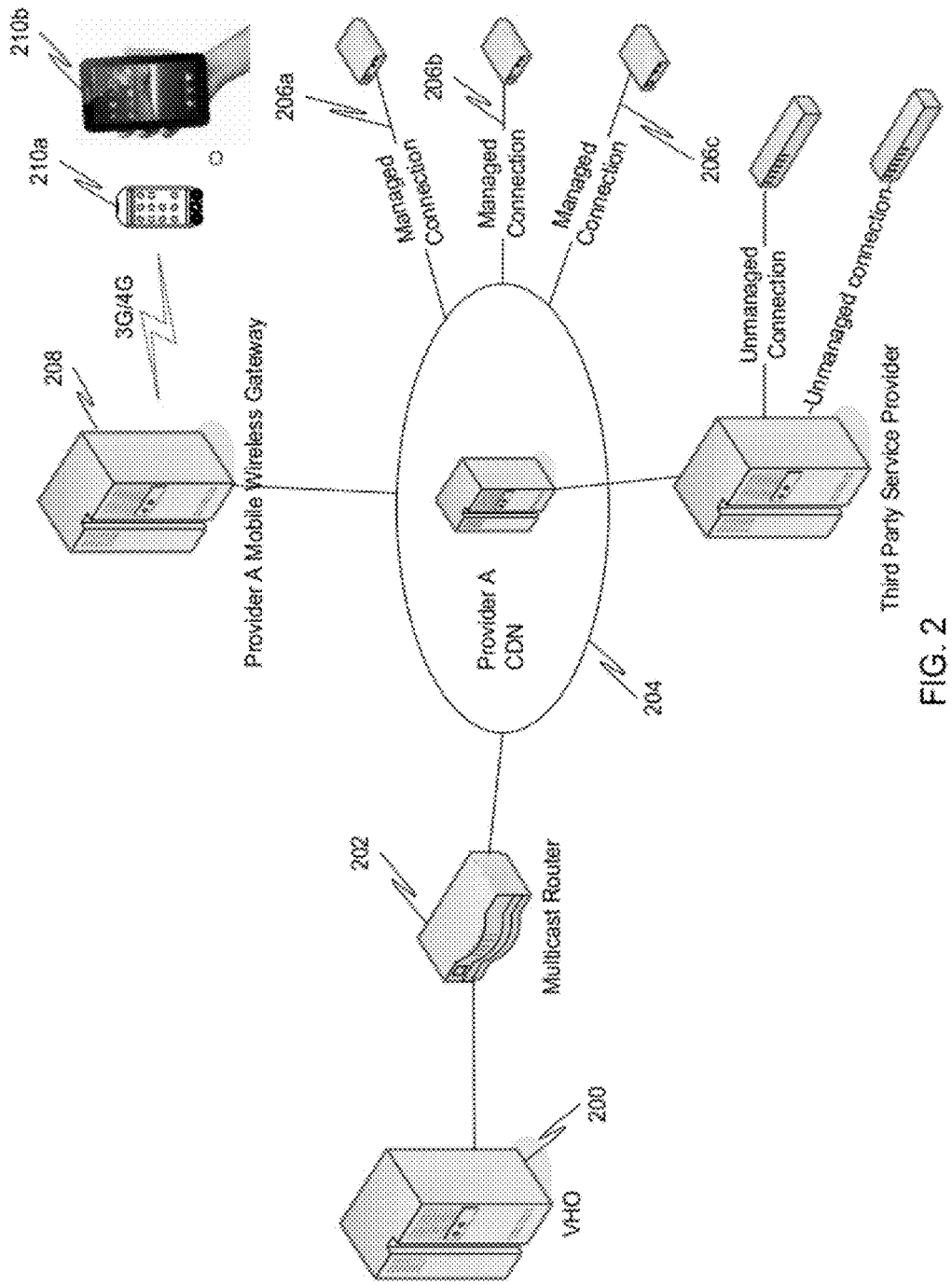
FIG. 2 depicts an example system for providing video services over managed and unmanaged broadband video connections to users.

One problem with the protocol stack utilized in FIG. 1 is that many consumer devices do not support this protocol directly. As such, any devices that support this video protocol stack must be controlled or provided by the service provider. This is depicted in FIG. 2. FIG. 2 depicts an example system for providing broadband video connections to users. Here, a service provider maintains a video hub office (VHO) 200, which is a regional location from which all of the TV signals are broadcast. The VHO may receive the video from Super Head Ends (SHEs). The video is then send to a multicast router 202, which broadcasts the video through a content distribution network (CDN) 204 to managed broadband connections 206a, 206b, 206c.

One problem with this approach is that the service provider A (e.g., AT&T) must control each portion of the network, from the VHO 200 to the managed connections 206a, 206b, 206c. Constant Bit Rate video stacks are sent only over premium high quality managed connections today. In an embodiment of the present invention, however, Provider A is a converged service provider and typically also has many Mobile subscribers connected via a wireless gateway 208. This includes 3G/4G compatible devices 210a, 210b. Additionally, provider A may be able to connect to a third party service provider 212 (e.g., Verizon) connected to the CDN 204, having its own managed or unmanaged connections. All the mobile subscribers may access the video broadcasts that have been adapted for non premium best effort managed connections (206b and 206c) and unmanaged connections (2106a and 206b) from a streaming adaptor located at the edges of Provider's A CDN 204. The provider A mobile wireless gateway 208 enables 3G/4G mobile connected devices (e.g., via smartphones, tablets, and MiFi hotspots), to access the video services as well, including on a standard CEA861 HDMI connected local device or on a standard LAN connected CEA2014 devices.

This technology also allows the idea of a traditional set-top box, at least as a stand-alone entity, to be eliminated, as a controlled adaptive stream proxy in accordance with the present invention can be added as software to any device in the network, including, for example, a smartphone or tablet. In another embodiment of the present invention this software can be housed in a small pocket sized portable set back box that can sit anywhere in the home LAN network or adjacent to a TV connected to multiple screens in the home using CEA861 controlled HDMI and LAN networked CEA2014 RUI and DLNA standards.

Figure 3:
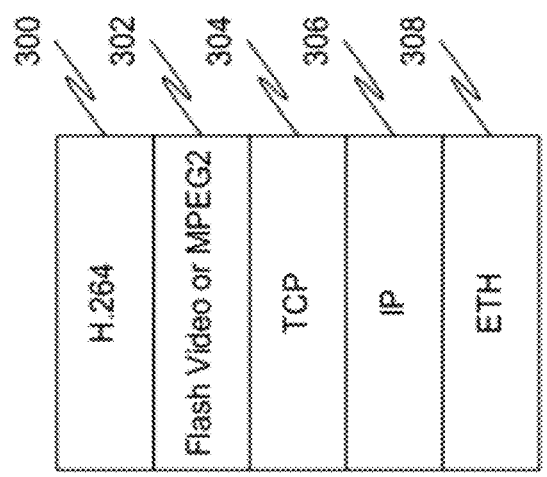
FIG. 3 is a diagram showing a protocol stack illustrating how video may be sent to many consumer devices on unmanaged broadband connection

One additional problem that must be addressed is that the protocol stack described in FIG. 1 and the corresponding text presently assumes a constant bit rate for the stream. Unmanaged broadband connections, however, require a adaptive bit rate for the video stream. More particularly, many consumer devices on unmanaged broadband connections may be looking for a protocol stack like that depicted in FIG. 3 using well known HTTP stream control protocols, rather than that of FIG. 1. Of course, the service provider can modify the unicast and broadcast streams from the VHO to through use of a streaming adaptor typically located at the edge of their CDN network facing the non premium managed and best effort unmanaged broadband connections to their mobile distribution partners and subsidiaries and to third party access providers but part of the rationale for the present invention is that the service provider is willing to introduce adaptive bite rate video technology at their edge of their CDN network and in their endpoint devices (mobile and fixed) in order to extend reach of their video services to their typically much larger mobile subscriber base and over the top of third party access providers to new subscribers. In one embodiment of the present invention, a constant bit rate video stream is converted to a standard home device compatible video stream by modifying a video stack of the video. In one very particular embodiment this may mean modifying the video stack from that depicted in FIG. 1 to that depicted in FIG. 3. However, one of ordinary skill in the art will recognize that alternative embodiments where other types of adaptive and constant bit rate video stream stacks than that depicted in FIG. 1 are converted to other types of non-adaptive bit rate video stream stacks than that depicted in FIG. 3.

In addition to converting the bit rate, a number of additional modifications can be made to affect the user's perception of the video. Specifically, there may be a desire to allow the user to control aspects of the video, such as a channel being displayed, much as he or she would be able to with a managed broadband connection. As such, in one embodiment of the present invention a video control stack of the video can be modified to be compatible with the user's device in the home network. Furthermore, there may be a desire to "fool" the device into thinking that the video actually is sent from a local server in the home network. As such, a home network stack can be added to the non adaptive bit rate video stream. Additionally, there may be a desire to provide other levels of human interaction with the video, such as a complete interactive user interface to be displayed on a television. As such, the device performing the conversion of the video stream can also act as a remote user interface (RUI) proxy by providing an RUI to the device in the home network. The RUI can provide a number of different interactive elements. For example, the user may be able to access the Internet on the television via the RUI. The user may also be able to access telephony services, such as a viewing visual voice mail, playing back voice mails, making and receiving telephone calls, etc. through the television.

Figure 4:
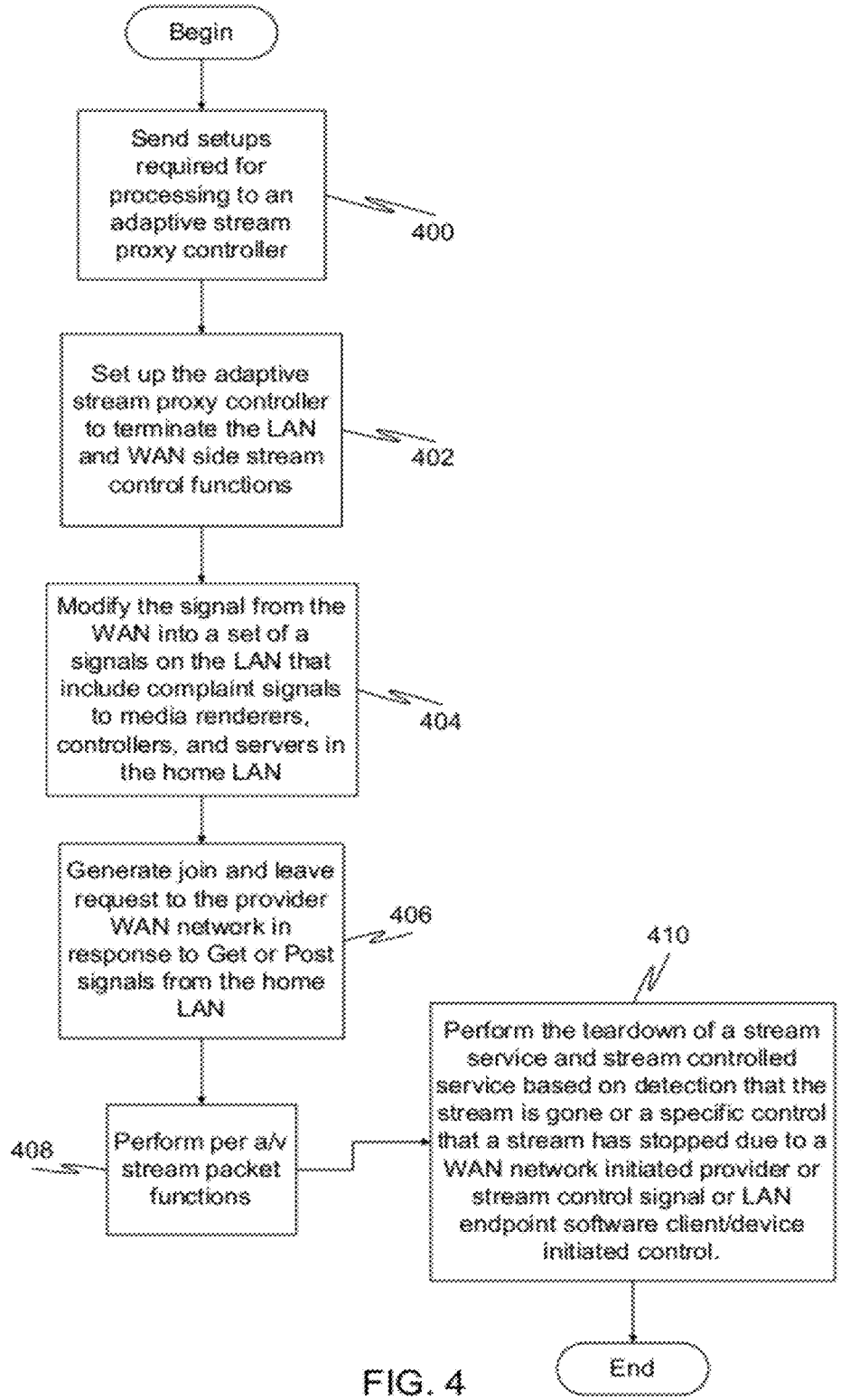
FIG. 4 is a diagram illustrating a method for processing adaptive stream functions on an audio/video stream and on stream control paths in accordance with one embodiment of the present invention.

FIG. 4 is a diagram illustrating a method for processing adaptive stream functions on an audio/video stream and on stream control paths in accordance with one embodiment of the present invention. At 400, setups required for processing are sent to an adaptive stream proxy controller. This may be sent from a provider headend control server in the WAN (such as an IPTV headend control server) or may be sent indirectly from a home endpoint device. This may be sent in a dynamic or a static manner and passed into the adaptive stream proxy through an application programming interface from other layers of networking software in the device, for the audio/video stream and audio-video stream control adaptation from ingress to egress, on the WAN side and on the LAN side.

At 402, the adaptive stream proxy controller is set up to terminate the LAN and WAN side stream control functions, such as RTSP, IGMP, or a specific HTTP set of signals, as provisioned in step 400 above. This includes adapting to the LAN-side DLNA home network standard protocols of DMS/DMC/DMR. It can also include making itself look like a DLNA compliant DMC or DMS in the home LAN for provider network located streaming services. It can also make itself look like a CEA 2014 compliant UI and stream server for the home. It can also be interworked through a local CEA 2014 RUI client to locally connected HDMI rendering audio and video rendering devices interworking with CEA861 interactivity messages. The functionality of this adaptive stream proxy of the present invention can be implemented in many different devices or components within a network. In one embodiment, it may be implemented in a consumer device, such as a tablet computer or smart phone. In another embodiment, it may be implemented into a personal wireless hot spot (e.g., MiFi) device. In another embodiment, it may be implemented into a portable set back box apparatus, which is a device small enough to attach to the back of a television that integrates to traditional well deployed television decoding and Internet access/decoding such as HDMI CEA861.

At 404, the adaptive stream proxy controller modifies the signal from the WAN into a set of signals on the LAN that include compliant signals to media renderers, controllers, and servers in the home LAN. For example, the adaptive stream proxy controller may modify an RTSP signal from the WAN into a set of HTTP signals on the LAN that include DLNA and CEA 2014 compliant signals.

At 406, the adaptive stream proxy controller generates join and leave requests to the provider WAN network in response to Get or Post signals from the home LAN. These Get or Post signals may be in DLNA or CEA 2014 compliant signaling.

At 408, the adaptive A/V stream transport mechanism in the adaptive stream proxy subsystem may perform per A/V stream packet functions, including, but not limited to:

Removal, addition, or modification of an MPEG2TS transport packet

Removal, addition, or modification of an MPEG4 transport packet

Removal, addition, or modification of an RTP packet header

Removal, addition, or modification of an HTTP packet header, such as content type or content size, in order to accommodate inflexible installed video streaming endpoints Removal, addition, or modification of UDP/TCP layer packet headers Detection and Rechunking of the multiplexed MPEG video packets to fit a traffic optimized WAN or LAN in terms of packets per second and bytes per packet Modification of the IP address and port number source or destination packet headers As an advanced function: dynamic addition and/or removal of elemental audio or video stream in MPEG2TS or MPEG4 transport headers from other audio and video sources related to the subscriber converged services such a mobile media and telephony services offered by the converged service provider A or from other service providers used by the user.

Provide statistics gathered and report adaptive stream and stream control proxy functions on the ingress and ingress. Furthermore, the user of this information to dynamically change behavior or connectivity of the stream path or stream control path.

At 410, the teardown of a stream service and stream controlled service may be performed based on detection that the stream is gone or a specific control that a stream has stopped due to a WAN network initiated provider or stream control signal or LAN endpoint software client/device initiated control.

In one embodiment of the present invention, the invention can operate on the existing constant bit rate premium managed broadband connections in a modified set-top box or new device apparatus/tablet in the home, converting one or more video streams to the home networked video endpoints. In this embodiment, there is no need for a conversion in the CDN to adaptive bit rate streams. In another embodiment, of the present invention, the conversion of constant bit rate video to adaptive bit rate video located in the CDN is utilized as well as the managed and unmanaged connections to the home. The conversion is first performed to arrive at non-adaptive bit rate video, then the other modifications to the video stream and the video control stacks are performed.

Figure 5:
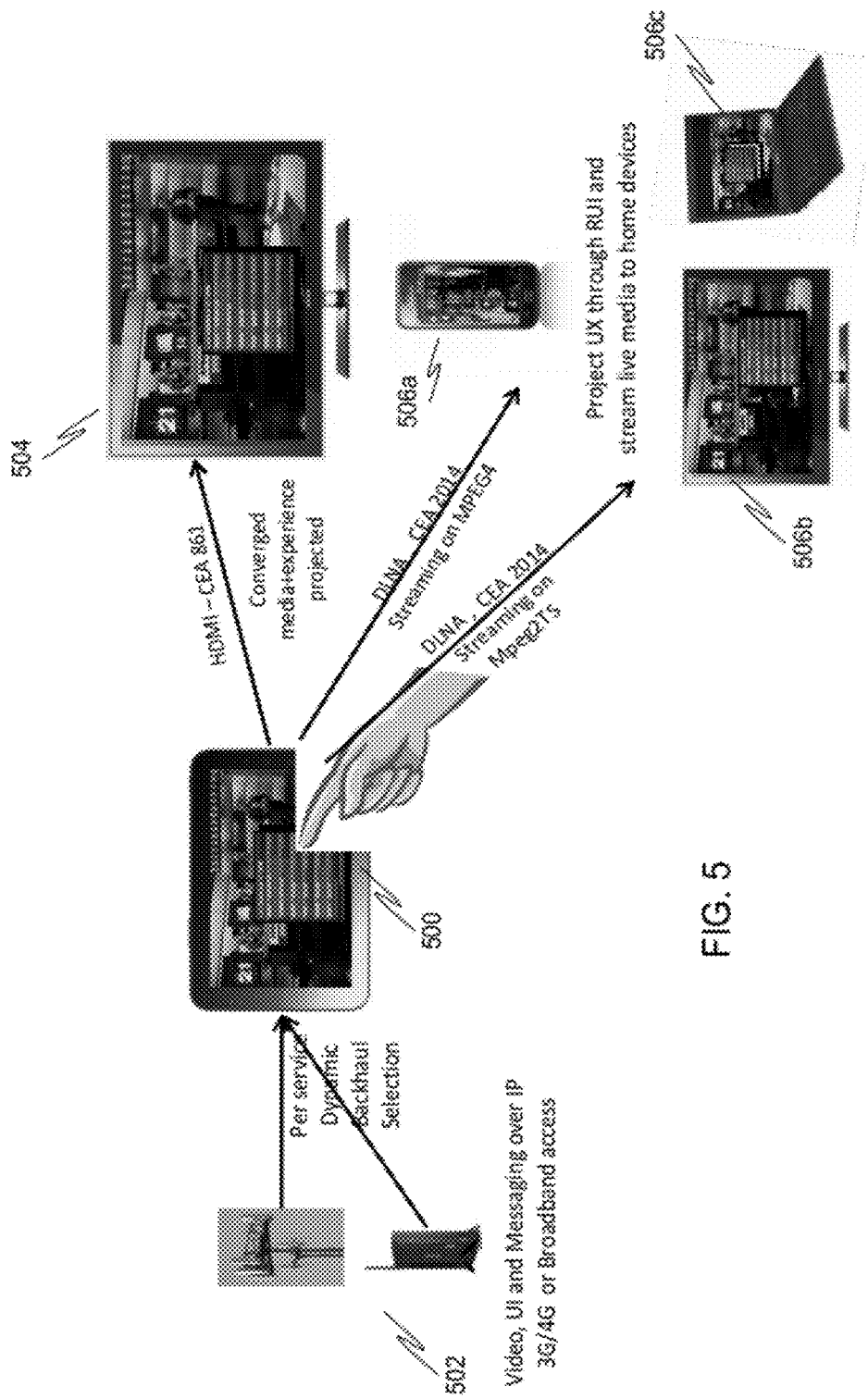
FIG. 5 is a diagram illustrating a tablet stream proxy use case and protocols in accordance with one embodiment of the present invention.

FIG. 5 is a diagram illustrating a tablet stream proxy use case in accordance with one embodiment of the present invention. Here, a tablet computer 500 receives one or more adaptive bit rate video streams over an unmanaged connection, such as via a 3G WAN 502. As described above, the received video stream may be converted to a non adaptive bit rate video stream and be passed to a user device. Here, four such devices are depicted. The first is a HDMI CEA 861 locally connected television 504. The second is a smart phone 506a, the third is a CEA2014 connected TV client 506b, and the forth is a CEA2014 connected PC. Either of the devices may be capable of displaying the video stream due to the tablet computer's conversion of the video stream. Additionally, the provider VHO may provide an HTML5 web served user interface to the devices 504, 506a, 506b, 506c with device 500 acting as a proxy for WAN network located RUI server.

Unlike a dual TV environment, where a video signal from a television may be replicated on a handheld device such as a tablet, in this embodiment the service originates from the service provider. Indeed, the user may have multiple different service providers (e.g., a telephone company provider of the tablet computer, a television provider with a set top box, and a national TV broadcast provider.

FIG. 5 also illustrates the control and streaming protocols involved in accordance with an embodiment of the present invention. Here, the provider video hub office previously illustrated in FIG. 2 item 200 is connected via managed and unmanaged broadband access connections at 502 and may communicate with an HTML5 user interface, as well as streaming IP video, and multimedia messaging service (MMS) messages, to the tablet computer 500. The tablet computer 500 acts as a proxy for the HTML5 user interface, projecting a RUI to the television 504 and a separate one to the smartphone 506a. Additionally, the tablet computer 500 may convert the incoming streaming IP video to a format appropriate for the particular device in the network. Here, the television 504 may accept h.264 over MPEG2TS, while the smartphone may accept h.264 over Mpeg4 transport.

Figure 6:
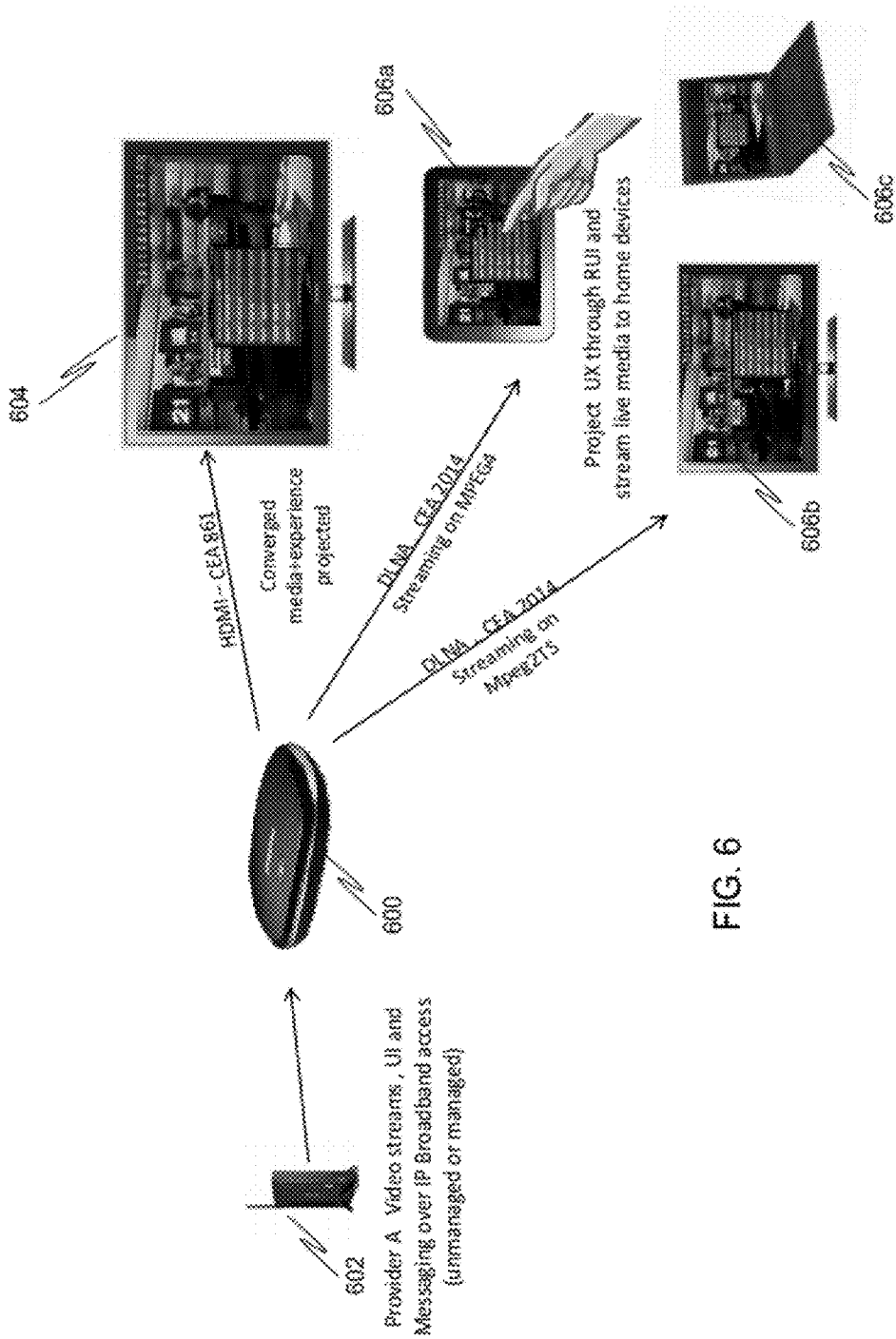
FIG. 6 is a diagram illustrating a fixed device apparatus use case and the protocols involved in the use case in accordance with an embodiment of the present invention.

FIG. 6 is a diagram illustrating an alternative form of an apparatus 600 that performs the same present invention functions of video adaptive proxy and RUI control proxy functions as the tablet 500 does in FIG. 5. Here, device 600 is a smaller more portable screenless device. Device 600 may interface to the same locally networked audio video rendering devices as device 500 in FIG. 5, including but not limited to for example a tablet device 606a, connected television 604 and connected television 606b and computer device 606c.

Figure 7:
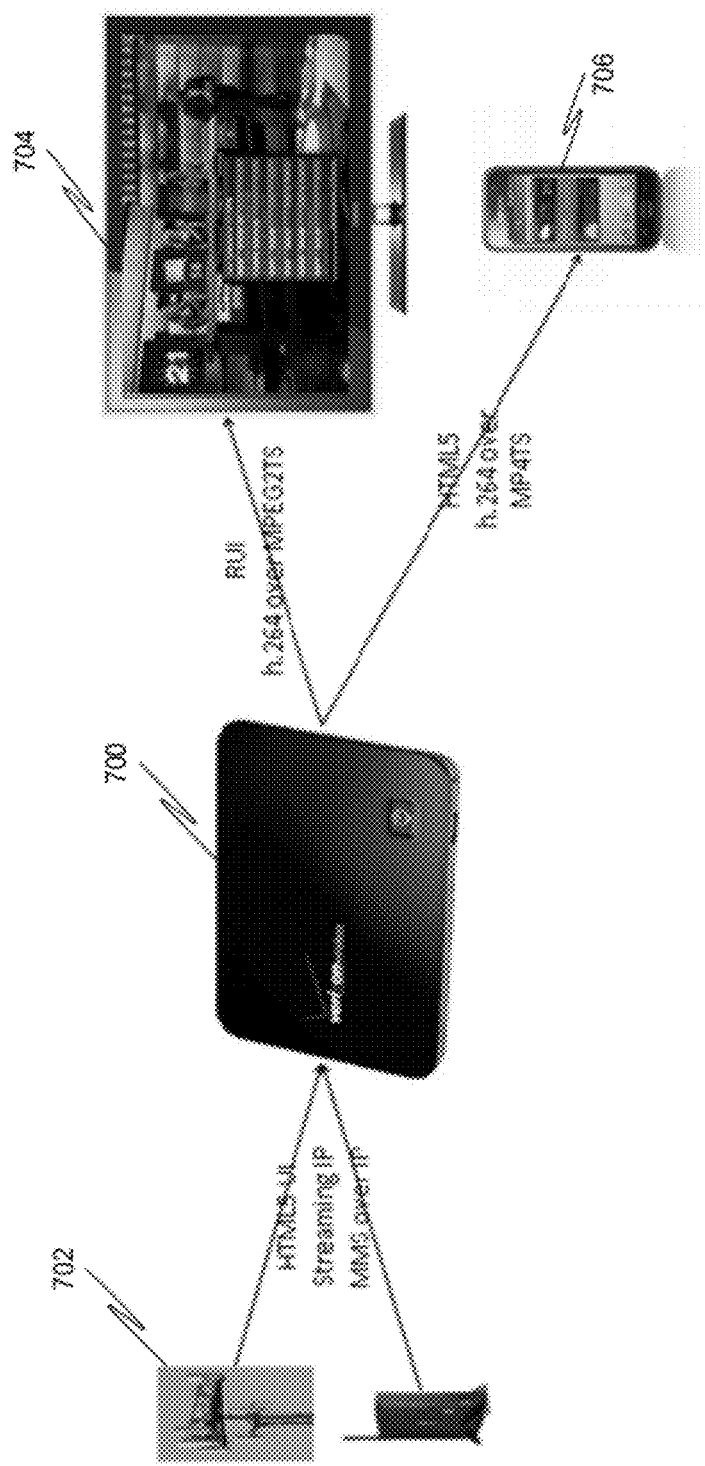
FIG. 7 is a diagram illustrating a 3G/4G wireless hotspot use case in accordance with an embodiment of the present invention.

FIG. 7 is a diagram illustrating a wireless hotspot use case in accordance with an embodiment of the present invention. A wireless hotspot is also sometimes known as a "MiFi" device. Here, the wireless hotspot 700 can receive a video stream via a 3G network 702. Much as in FIGS. 5 and 6, the wireless hotspot 700 can include a proxy that converts constant bit rate video streams received via the 3G network 702 to a constant bit rate video stream compatible with device 704 or device 706.

In one embodiment of the present invention, the audio portion of the converted non adaptive bit rate video stream may be augmented with additional audio by multiplexing in an audio stream from a different source. For example, while watching a football game on a television, the user may hear a voice mail message left for him on his home or mobile phone number intermixed with the audio of the football game.

This same audio video multiplexing control mechanism in the present invention may be used to deliver multiple versions of the video stream in the same signal. For example, a version of a movie with a first video stack making it compatible with a mobile phone may be delivered multiplexed in the same stream as another version of the movie with a second video stack making it compatible with a tablet computer.

Figure 8:
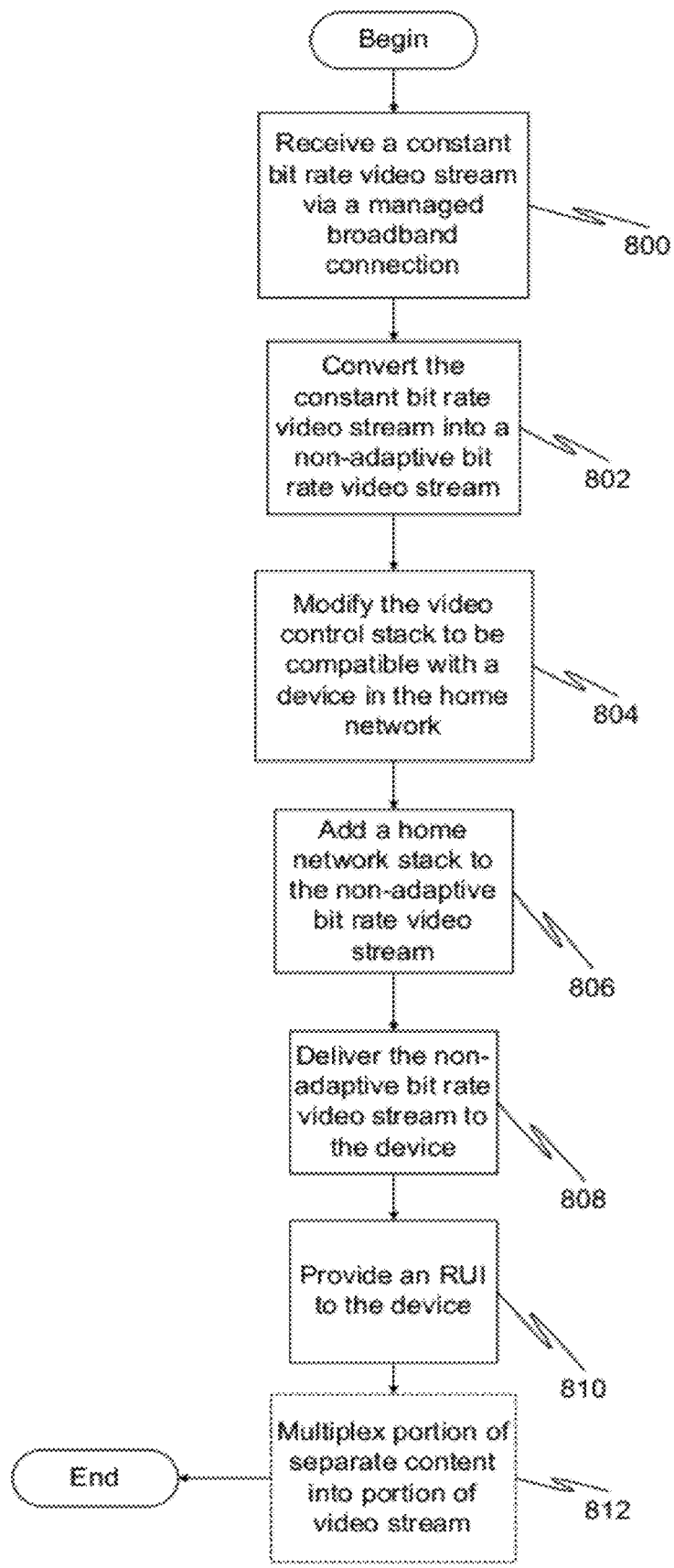
FIG. 8 is a flow diagram illustrating a method in accordance with an embodiment of the present invention.

FIG. 8 is a flow diagram illustrating a method in accordance with an embodiment of the present invention. At 800, a constant bit rate video stream representing a single video is received from a video source via an unmanaged broadband connection. At 802, the constant bit rate video stream is converted into a non-adaptive bit rate video stream by modifying a video transport stack of the video to be compatible with a home device media player transport stack. At 804, a video control stack of the video is modified to be compatible with a device in a home network. This modification may allow, for example, a user of the device in the home network to change a channel of the non-adaptive bit rate video stream. At 806, a home network stack is added to the non-adaptive bit rate video stream, wherein the home network stack is such that it would appear to the device in the home network as if the non-adaptive bit rate video stream came from a server local to the home network. At 808, the non-adaptive bit rate video stream is delivered to a device in the home network. At 810, a component executing the method can act as a RUI proxy by providing an RUI to the device in the home network, the RUI allowing a user of the device in the home network to interact with the video source to control aspects of the video via the RUI proxy. The RUI may be, for example, an interactive television interface.

At 812, optionally, a portion of separate content (such as a voice mail) may be multiplexed into a portion of the non-adaptive bit rate video stream prior to delivering it to a device in the home network.

Figure 9:
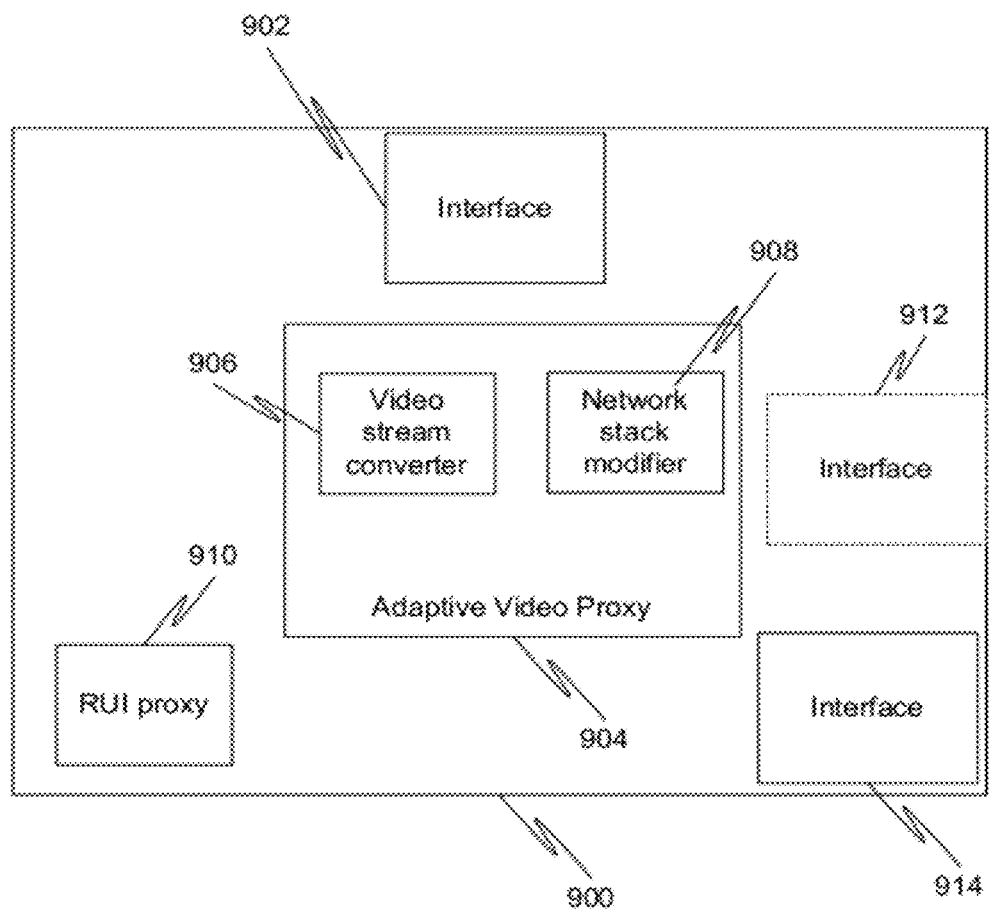
FIG. 9 is a block diagram illustrating an adaptive proxy device in accordance with an embodiment of the present invention.

FIG. 9 is a block diagram illustrating an adaptive proxy device in accordance with an embodiment of the present invention. Here, the adaptive proxy device 900 may include an interface 902 designed to receive one or more adaptive and constant bit rate video streams from one or more video sources over a managed or unmanaged connection. The adaptive proxy device 900 can also include an adaptive video proxy 904. The adaptive video proxy 904 may include a video stream converter 906, which is designed to convert the one or more adaptive bit rate video streams into a first non-adaptive bit rate video stream by modifying a video stack of the video, and to modify a video control stack of the video to be compatible with a device in a home network. The adaptive video proxy 904 may also include a network stack modifier 908 designed to add a home network stack to the first non-adaptive bit rate video stream, wherein the home network stack is such that it would appear to the device in the home network as if the first non-adaptive bit rate video stream came from a server local to the home network. The adaptive proxy device 900 can also include an RUI proxy 910 designed to provide an RUI to the device in the home network, the RUI allowing a user of the device in the home network to interact with the video source to control aspects of the video via the RUI proxy. The adaptive proxy device 900 can also include an interface 912 designed to receive a second non-adaptive bit rate video stream from a video hub office via a multicast router. This second non-adaptive bit rate video stream does not need to be converted in order to be played on the device. In fact, it can simply be delivered to the device via the managed connection.

The adaptive proxy device 900 can also include an interface 914 containing a local video display connection as well as a home network connection. The RUI proxy 910 works with both functions of the interface 914. The local video display connection of interface 914 may also detect and receive TV remote control commands and detect the presence of locally connected audio/video devices, as well as receive and transmit subtending audio/video local device power control signals in interworking these components with the RUI proxy 910, allowing a user of the device in the home network to interact with the video source to control aspects of the video. This same mechanism can be used to transmit device information about the device to the RUI proxy, which can then forward it to the provider, as well as to receive information from the provider and transmit it to the device.

In another embodiment of the present invention, one or more CDN edge devices may receive the constant bit rate video stream and may perform a conversion of this constant bit rate. The resulting converted video stream may be called an "adaptive" bit rate video stream. In such embodiments, the present invention may receive this adaptive bit rate video stream and convert it to a non-adaptive bit rate video stream by modifying the video stack as described earlier.

As will be appreciated to one of ordinary skill in the art, the aforementioned example architectures can be implemented in many ways, such as program instructions for execution by a processor, as software modules, microcode, as computer program product on computer readable media, as logic circuits, as application specific integrated circuits, as firmware, as consumer electronic device, etc. and may utilize wireless devices, wireless transmitters/receivers, and other portions of wireless networks. Furthermore, embodiment of the disclosed method and system for displaying multimedia content on multiple electronic display screens can take the form of an entirely hardware embodiment, an entirely software embodiment, or an embodiment containing both software and hardware elements.

The term "computer readable medium" is used generally to refer to media such as main memory, secondary memory, removable storage, hard disks, flash memory, disk drive memory, CD-ROM and other forms of persistent memory. It should be noted that program storage devices, as may be used to describe storage devices containing executable computer code for operating various methods of the present invention, shall not be construed to cover transitory subject matter, such as carrier waves or signals. Program storage devices and computer readable medium are terms used generally to refer to media such as main memory, secondary memory, removable storage disks, hard disk drives, and other tangible storage devices or components.

Although only a few embodiments of the invention have been described in detail, it should be appreciated that the invention may be implemented in many other forms without departing from the spirit or scope of the invention. Therefore, the present embodiments should be considered illustrative and not restrictive and the invention is not to be limited to the details given herein, but may be modified within the scope and equivalents of the appended claims.

What is claimed is:

1. A method comprising:
receiving a constant bit rate video stream representing a single video from a video source via a managed broadband connection;
converting the constant bit rate video stream into a single non-adaptive bit rate video stream by modifying a video transport protocol stack of the video stream for compatibility with a home device media player video transport protocol stack;
modifying a video control protocol stack of the non-adaptive bit rate video stream for compatibility with a device in a home network;
adding a home networking transport protocol stack to the video stream, wherein the home networking transport protocol stack is such that it would appear to the device in the home network as if the video stream came from a server local to the home network;
delivering the video stream to a device in the home network; and
acting as a remote user interface (RUI) proxy by providing an RUI to the device in the home network, the RUI allowing a user of the device in the home network to interact with the video source to control aspects of the video via the RUI proxy.

2. The method of claim 1, wherein the modification of the video control stack allows a user of the device in the home network to change a channel of the video stream.

3. The method of claim 1, wherein the RUI is an interactive television interface.

4. The method of claim 1, wherein the video stream includes a video portion and an audio portion and the method further comprises:
multiplexing an audio portion of separate content into the audio portion of the video stream prior to delivering it to a device in the home network.

5. The method of claim 1, wherein the RUI proxy automatically converts control packets from one protocol to another protocol.

6. The method of claim 1, wherein the video transport protocol stack comprises multiple different protocols.

7. The method of claim 6, wherein modifying the video transport protocol stack of the video stream for compatibility with the home device media player video transport protocol stack comprises replacing one or more protocols in the video transport protocol stack with one or more protocols compatible with the home device media player video transport protocol stack.

8. The method of claim 1, further comprising providing an adaptive video proxy for the home network in a central hub location, wherein the adaptive video proxy interfaces the managed broadband connection and an unmanaged broadband connection in a wide area network (WAN).

9. The method of claim 8, wherein the adaptive video proxy performs a mix of video streaming transport layer adaptations, adaptive media proxies and adaptive media control proxies.

10. A method comprising:
receiving multiple constant bit rate video streams representing multiple videos from a video source via a managed broadband connection;
converting the constant bit rate video streams into one or more non-adaptive bit rate video streams by modifying a video transport protocol stack of the video streams for compatibility with a home device media player video transport protocol stack;
modifying a video control protocol stack of the one or more non-adaptive bit rate video streams for compatibility with a device in a home network;
adding a home networking transport protocol stack to the video streams, wherein the home network protocol stack is such that it would appear to the devices in the home network as if the respective video streams came from a server local to the home network;
delivering the video streams to one or more devices in the home network;
acting as a remote user interface (RUI) proxy by providing one or more RUIs to the one or more devices in the home network, the one or more RUIs allowing users of the devices in the home network to interact with the video source to control aspects of the video via the RUI proxy.

11. A method comprising:
receiving one or more adaptive bit rate video streams video streams representing a single video from a video source via an unmanaged broadband connection;
converting the adaptive bit rate video streams into a non-adaptive single bit rate video stream by modifying a video protocol stack of the video streams;

modifying a video control protocol stack of the non-adaptive single bit rate video stream for compatibility with a device in a home network;

adding a home network protocol stack to the single bit rate video stream, wherein the home network protocol stack is such that it would appear to the device in the home network as if the single bit rate video stream came from a server local to the home network;

delivering the single bit rate video stream to a device in the home network; and acting as a remote user interface (RUI) proxy by providing an RUI to the device in the home network, the RUI allowing a user of the device in the home network to interact with the video source to control aspects of the video via the RUI proxy.

12. The method of claim 11, wherein the aspects of the video controlled via the RUI proxy include: video stream conversion, video control stack modifications, home networking control stack modifications and delivery of the video streams to multiple devices.

13. The method of claim 12, wherein the adding a home network stack includes adding Digital Living Network Alliance (DLNA) protocol headers to packets in the single bit rate video stream.

14. The method of claim 12, wherein the delivering the single bit rate video stream to a device comprises delivering the single bit rate video stream to the device via a managed broadband connection.

15. The method of claim 12, wherein the RUI repeats commands received by the device to the RUI proxy.

16. The method of claim 12, wherein the RUI proxy acts to obtain device information from the device and pass it to the video source.

17. The method of claim 12, wherein the RUI proxy acts to obtain information from the video source and pass it to the RUI.

18. The method of claim 11, wherein the adding the home network protocol stack includes adding Universal Plug and Play (UPnP) protocol headers to packets in the single bit rate video stream.

19. A proxy comprising:
an interface designed to receive one or more adaptive bit rate video streams from one or more video sources over an unmanaged connection, the adaptive bit rate video streams representing a single video;
an adaptive video proxy including:
a video stream converter designed to convert the one or more adaptive bit rate video streams into a non-adaptive first single video stream by modifying the video protocol stack of the video streams, and to modify a video control protocol stack of the non-adaptive first single video stream for compatibility with a device in a home network;
a network stack modifier designed to add a home network protocol stack to the non-adaptive first single video stream, wherein the home network protocol stack is such that it would appear to the device in the home network as if the non-adaptive first single video stream came from a server local to the home network; and
an RUI proxy designed to provide an RUI to the device in the home network, the RUI allowing a user of the device in the home network to interact with the video source to control aspects of the video via the RUI proxy.

20. The proxy of claim 19, further comprising an interface designed to receive a second single video stream from a video hub office via a multicast router.

21. The proxy of claim 20, further comprising a managed connection to a television, wherein the first single video stream is delivered to the television via the managed connection.

22. The proxy of claim 21, wherein the second single video stream is delivered to the television via the managed connection.

23. A system comprising:
a video hub office (VHO);
a multicast router connected to the VHO via a managed broadband connection;
a content distribution network (CDN) connected to the multicast router via a managed broadband connection;
one or more adaptive multirate multistream converter devices at an edge of the CDN configured to prepare the streams for both unmanaged broadband connections and best effort managed broadband connections;
a third party service provider connected to the CDN via an unmanaged broadband connection;
a device connected to the CDN via a managed broadband connection, wherein the device is designed to expect non-adaptive bit rate video streams sent via the managed broadband connection; and
an adaptive video proxy designed to convert a one or more adaptive bit rate video streams from the third party service provider into one or more non-adaptive bit rate video streams suitable for transmission to the device via the managed broadband connection by modifying a video protocol stack and a video control protocol stack of the non-adaptive bit rate video stream.

24. The system of claim 23, further comprising:
an RUI proxy designed to provide an RUI to the device, allowing a user of the device to interact with the third party service provider to control aspects of the video via the RUI proxy.

25. The system of claim 23, wherein the adaptive video proxy is located in the CDN and the converted non-adaptive bit rate video stream is delivered to the device via a managed broadband connection.

26. The system of claim 23, wherein the adaptive video proxy is located in a home network containing the device and the converted non-adaptive bit rate video stream is delivered to the device via an unmanaged broadband connection.

27. A non-transitory program storage device readable by a machine tangibly embodying a program of instructions executable by the machine to perform a method comprising:
receiving a constant bit rate video stream representing a single video from a video source via a managed broadband connection;
converting the constant bit rate video stream into a single non-adaptive bit rate video stream by modifying a video transport protocol stack of the constant bit rate video stream for compatibility with a home device media player video transport protocol stack;
modifying a video control protocol stack of the single non-adaptive bit rate video stream for compatibility with a device in a home network;
adding a home networking transport protocol stack to the single non-adaptive bit rate video stream, wherein the home networking transport protocol stack is such that it would appear to the device in the home network as if the video single non-adaptive bit rate stream came from a server local to the home network; and
delivering the single non-adaptive bit rate video stream to a device in the home network.

28. The non-transitory program storage device of claim 27, wherein the method further comprises acting as a remote user interface (RUI) proxy by providing an RUI to the device in the home network, the RUI allowing a user of the device in the home network to interact with the video source to control aspects of the video via the RUI proxy.

29. An apparatus comprising:
means for receiving one or more adaptive bit rate video streams video streams representing a single video from a video source via an unmanaged broadband connection;
means for converting the adaptive bit rate video streams into a non-adaptive single bit rate video stream by modifying a video protocol stack of the adaptive bit rate video streams;
means for modifying a video control protocol stack of the non-adaptive single bit rate video stream for compatibility with a device in a home network;
means for adding a home network protocol stack to the single bit rate video stream, wherein the home network protocol stack is such that it would appear to the device in the home network as if the single bit rate video stream came from a server local to the home network;
means for delivering the single bit rate video stream to a device in the home network; and
means for acting as a remote user interface (RUI) proxy by providing an RUI to the device in the home network, the RUI allowing a user of the device in the home network to interact with the video source to control aspects of the video via the RUI proxy.

* * * * *